C. W. SALADEE.

CURRY-COMB.

No. 6,911. Reissued Feb. 8, 1876.

INVENTOR.
Cyrus W. Saladee.
Assignees.
Hotchkiss Sons.
Chas. A. Hotchkiss.
President.
by Gilmore & Co.
ATTORNEYS WITNESSES
Robert Everett
E. H. Bates

N. PETERS, PHOTO-LITHOGRAPHER, WASHINGTON, D. C.

UNITED STATES PATENT OFFICE.

CYRUS W. SALADEE, OF PUTNAM, OHIO, ASSIGNOR TO HOTCHKISS SONS, OF BRIDGEPORT, CONNECTICUT.

IMPROVEMENT IN CURRY-COMBS.

Specification forming part of Letters Patent No. 45,640, dated December 27, 1864; reissue No. 1,854, dated January 24, 1865; reissue No. 6,788, dated December 7, 1875; reissue No. 6,911, dated February 8, 1876; application filed January 22, 1876.

*To all whom it may concern:*

Be it known that CYRUS W. SALADEE, of Putnam, Muskingum county, and State of Ohio, did invent a new and Improved Mode of Constructing Curry-Combs; and I do hereby declare that the following is a full and exact description thereof, reference being had to the accompanying drawings and the letters of reference marked thereon.

Figure 1:
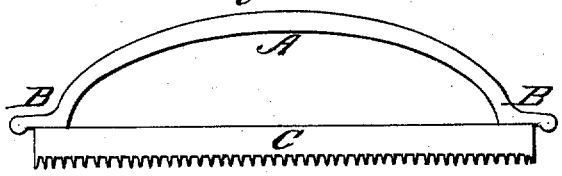
Figure 2:
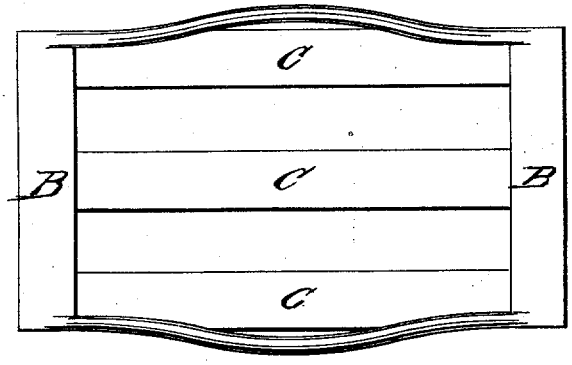
Figure 3:
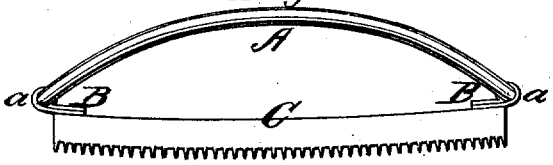

Figure 1 is a front view of the curry-comb, and Fig. 2 is a plan view thereof. Fig. 3 is front view of a modification of Fig. 1, and Fig. 4 is a plan view of the same.

This invention relates to curry-combs; and it consists in providing for such combs raised and rigid bars, that are adapted to serve the double purpose of a grasping-handle, and as braces for strengthening the comb.

In the accompanying drawings, Figs. 1 and 2, B B represent transverse or end bars of a curry-comb, and A A raised bars united to the comb, and which serve the double purpose of a handle to be grasped by the operator, and as braces for the comb. C C C represents a series of plates bent into the shape of troughs, and having currying-teeth on their edges, as shown. These plates are usually connected by being riveted to the bars B B.

Figure 4:
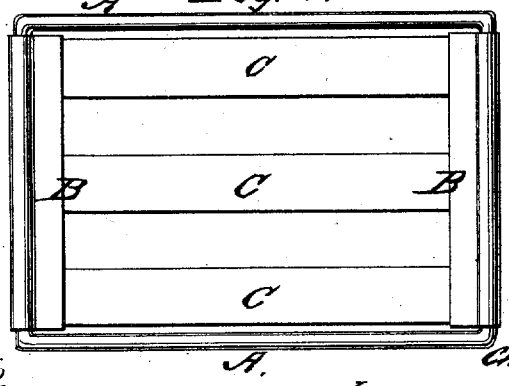

The curry-comb represented by Figs. 1 and 2 has the raised handles and the bars B formed of one piece of metal; but if desired the said parts may be made separately, and the ends of the bars or handle inserted into eyes *a a* formed in bars B B, as shown on Figs. 3 and 4.

The gist of this invention consists, broadly, in providing for grasping a curry-comb directly over its top or back by means of rigid raised bars secured thereto, by any suitable means, when such bars serve at the same time as braces for strengthening the comb.

It is obvious that by my devices the necessity of frequently changing the position of the comb in the operator's hand, as is usual with a side handle, is prevented, and also that a better purchase is obtained than can be secured by the use of side handles.

It is obvious that my handles or braces are adapted for use with any form of curry-comb, whether the comb-plates be channeled or otherwise.

What is claimed as new, and desired to be secured by Letters Patent, is—

1. A curry-comb, provided with a grasping device or handle above its back, consisting of raised inflexible bars, rigidly secured to the comb, and terminating in separate points of contact therewith, which said bars also serve as braces for strengthening the comb, substantially as specified.

2. The channeled plates C, provided with currying-teeth on their edges, and connected by end cross-bars, in combination with the bracing-bars A A, substantially as described.

In testimony that I claim the above I have hereunto subscribed my name in the presence of two witnesses.

HOTCHKISS SONS,

By C. A. HOTCHKISS, *President.*

Attest:

D. D. KANE,

GEORGE E. UPHAM.